United States Patent
Yoon et al.

(10) Patent No.: US 9,542,959 B2
(45) Date of Patent: Jan. 10, 2017

(54) PROTECTING INFORMATION WRITTEN TO RECORDING MEDIUM

(71) Applicant: SEAGATE TECHNOLOGY INTERNATIONAL, Grand Cayman (KY)

(72) Inventors: Seong-yong Yoon, Geonggi-do (KR); Tae-won Kim, Seoul (KR)

(73) Assignee: Seagate Technology International, Grand Cayman (KY)

( * ) Notice: Subject to any disclaimer, the term of this patent is extended or adjusted under 35 U.S.C. 154(b) by 0 days.

(21) Appl. No.: 14/262,739

(22) Filed: Apr. 26, 2014

(65) Prior Publication Data

US 2014/0233131 A1    Aug. 21, 2014

Related U.S. Application Data

(63) Continuation of application No. 13/080,815, filed on Apr. 6, 2011, now Pat. No. 8,711,503.

(30) Foreign Application Priority Data

Apr. 7, 2010    (KR) .................. 10-2010-0031882

(51) Int. Cl.
| | |
|---|---|
| *G11B 5/02* | (2006.01) |
| *G11B 20/10* | (2006.01) |
| *G11B 20/12* | (2006.01) |
| *G11B 19/04* | (2006.01) |
| *G11B 20/00* | (2006.01) |
| *G11B 5/00* | (2006.01) |

(52) U.S. Cl.
CPC ............. *G11B 5/02* (2013.01); *G11B 19/04* (2013.01); *G11B 20/10212* (2013.01); *G11B 20/1217* (2013.01); *G11B 20/00086* (2013.01); *G11B 2005/001* (2013.01); *G11B 2020/1238* (2013.01); *G11B 2220/2516* (2013.01)

(58) Field of Classification Search
None
See application file for complete search history.

(56) References Cited

U.S. PATENT DOCUMENTS

| | | | | |
|---|---|---|---|---|
| 7,733,589 | B2 * | 6/2010 | Wada et al. ..................... | 360/48 |
| 2006/0114589 | A1 * | 6/2006 | Nikitin ................... | B82Y 10/00 |
| | | | | 360/55 |
| 2008/0204915 | A1 * | 8/2008 | Albrecht et al. ................ | 360/48 |

OTHER PUBLICATIONS

U.S. Appl. No. 13/080,815, filed Apr. 6, 2011, parent to the present application.

* cited by examiner

*Primary Examiner* — Daniell L Negron

(57) ABSTRACT

A data storage device can include a recording medium; a controller unit to generate control signals in response to write information and write commands; and a transducer section coupled to receive the controls signals, and in response, write the write information into the recording medium and form a data protection pattern in the recording medium adjacent to the write information.

10 Claims, 10 Drawing Sheets

PROTECTING INFORMATION WRITTEN TO RECORDING MEDIUM

CROSS-REFERENCE TO RELATED APPLICATIONS

This application is a continuation of U.S. patent application Ser. No. 13/080,815 filed on Apr. 6, 2011, which claims priority under 35 U.S.C. §119(a) from Korean Patent Application No. 10-2010-0031882, filed on Apr. 7, 2010, in the Korean Intellectual Property Office, the disclosures of which are incorporated herein in their entirety by reference.

BACKGROUND

1. Field of the Invention

The present general inventive concept relates to a method and apparatus to protect information in a data storage device, and more particularly, to a method and apparatus to protect information written to a recording medium.

2. Description of the Related Art

A disk drive is one of data storage devices, in which information is stored by magnetizing a surface of a disk, To improve the quality of a data storage device, research into protecting data written to a recording medium, such as a disk, from being distorted is being performed.

SUMMARY

The present general inventive concept provides a method of protecting information written to a recording medium to minimize and/or prevent distortion of the information by improving magnetization characteristics with respect to the information written to the recording medium.

The present general inventive concept provides a disk drive that protects information written to a recording medium that minimized and/or prevents distortion of the information by improving magnetization characteristic with respect to the information written to the recording medium.

The present general inventive concept provides a recording medium in which information is written so as to have improved magnetization characteristics.

Additional features and utilities of the present general inventive concept will be set forth in part in the description which follows and, in part, will be obvious from the description, or may be learned by practice of the present general inventive concept.

Exemplary embodiments of the present general inventive concept provide a method of protecting information written to a recording medium includes magnetizing the recording medium to form a first magnetic pattern corresponding to information to be stored, and magnetizing the recording medium to form a protective magnetic pattern having a phase difference of 180° from the first magnetic pattern at a position adjacent to where the first magnetic pattern is formed, with adjacent bits of the first magnetic pattern opposite and the protective magnetic pattern opposite to each other.

In the magnetizing of the recording medium to form a protective magnetic pattern, the recording medium may be magnetized to form a protective magnetic pattern having a phase difference of 180° from the first magnetic pattern at positions adjacent on both sides of a position where the first magnetic pattern is formed.

The first magnetic pattern and the protective magnetic pattern may be formed on the recording medium by perpendicular magnetic recording.

The recording medium may include a disk and the disk may be magnetized to form a protective magnetic pattern having a phase difference of 180° from the first magnetic pattern at a position adjacent to where the first magnetic pattern is formed, with bits of adjacent tracks opposite to each other.

The disk may be magnetized to form a protective magnetic pattern having a phase difference of 180° from the first magnetic pattern at positions adjacent on both sides of a disk track where the first magnetic pattern is formed.

In the magnetizing of the recording medium to form a protective magnetic pattern, the protective magnetic pattern may be formed only when the information to be stored is classified as having a frequency of use that is higher than a critical frequency during the operation of a data storage device.

In the magnetizing of the recording medium to form a protective magnetic pattern, the protective magnetic pattern may be selectively formed only when the information to be stored is classified as information related to the operation of a data storage device.

The method may further include registering an area where the protective magnetic pattern is formed as a protection area that is managed so that no information is stored thereon.

Exemplary embodiments of the present general inventive concept also provide a disk drive including a disk having a plurality of tracks, a selective inversion circuit to selectively output a first signal to be written to the disk or an inversed first signal having a phase difference of 180° from the first signal, a preamplifier to generate a current corresponding to a signal output from the selective inversion circuit, a magnetic head to form a magnetic pattern on a track of the disk according to the current generated by the preamplifier, and a controller to control a position of the magnetic head and the selective inversion circuit so as to form a protective magnetic pattern having a phase difference of 180° from the first magnetic pattern according to the inversed first signal at a position of a track adjacent to the track of the disk where the first magnetic pattern is formed according to the first signal, with bits of adjacent tracks opposite to each other.

The selective inversion circuit may include an inverter to invert the phase of the first signal and to output an inverted first signal, and a multiplexer to input the first signal to a first input terminal, to input the inverted first signal to a second input terminal, and to connect one of the first input terminal and the second input terminal to an output terminal according to a selection control signal.

The selection control signal may determine that the first input terminal is connected to the output terminal in the multiplexer in a section where the first magnetic pattern is formed, and that the second input terminal is connected to the output terminal in the multiplexer in a section where the protective magnetic pattern is formed.

The controller may be controlled to form the protective magnetic pattern only when the information to be stored is classified as having a frequency of use that is higher than a critical frequency during the operation of a data storage device.

The controller selectively may form the protective magnetic pattern only when the first signal is classified as a signal related to the operation of the disk drive.

The controller may register an area where the protective magnetic pattern is formed as a protection area that is managed so that no information is stored thereon.

Information may be written to the disk in a pattern by perpendicular magnetization.

The disk may have a structure in which a substrate, a soft magnetic underlayer, an intermediate layer, and a recording layer are sequentially stacked.

Exemplary embodiments of the present general inventive concept may also provide a recording medium including a recording layer where information is stored, and on which a protective magnetic pattern is formed having a phase difference of 180° from a first magnetic pattern corresponding to information to be stored at a position adjacent to where the first magnetic pattern is formed, with adjacent bits of the first magnetic pattern opposite and protective magnetic pattern opposite to each other.

A pattern may be formed by perpendicular magnetization according to recording current corresponding to the information to be stored on the recording layer.

The recording layer may be formed on a stack comprising the substrate, the soft magnetic underlayer, and the intermediate layer in the order stated.

The recording medium may include a disk and a protective magnetic pattern having a phase difference of 180° from the first magnetic pattern that is formed in a track adjacent to a track of a disk where the first magnetic pattern is formed, with bits of adjacent tracks opposite to each other, Exemplary embodiments of the present general inventive concept may also provide a method of protecting information written to a recording medium, the method including forming a first magnetic pattern of information to be stored on the recording medium, and forming a second magnetic pattern adjacent to the first magnetic pattern, where the second magnetic pattern has different phase than the first magnetic pattern.

The method may also include forming a third magnetic pattern having the same phase as the second magnetic pattern, where the first and third magnetic patterns are adjacent to both sides of the second magnetic pattern.

The method may also include that the second magnetic pattern is formed when the information to be stored has a frequency of use that is higher than a predetermined frequency.

Exemplary embodiments of the present general inventive concept may also provide a data storage device including a recording medium having a plurality of tracks, a magnetic head to form a magnetic pattern on at least one track of the recording medium, and a controller to control the magnetic head to form a first magnetic pattern of information to be stored on the recording medium and a second magnetic pattern adjacent to the first magnetic pattern, where the second magnetic pattern has different phase than the first magnetic pattern.

The controller of the data storage device may control the magnetic head to form a third magnetic pattern having the same phase as the second magnetic pattern, where tile first and third magnetic patterns are adjacent to both sides of the second magnetic pattern.

The controller of the data storage device may control the magnetic head to form the second magnetic pattern when the information to be stored has a frequency of use that is higher than a predetermined frequency.

BRIEF DESCRIPTION OF THE DRAWINGS

The above and/or other utilities of the present general inventive concept will become apparent and more readily appreciated from the following description of the exemplary embodiments, taken in conjunction with the accompanying drawings, in which.

DETAILED DESCRIPTION OF THE EMBODIMENTS

Figure 1:
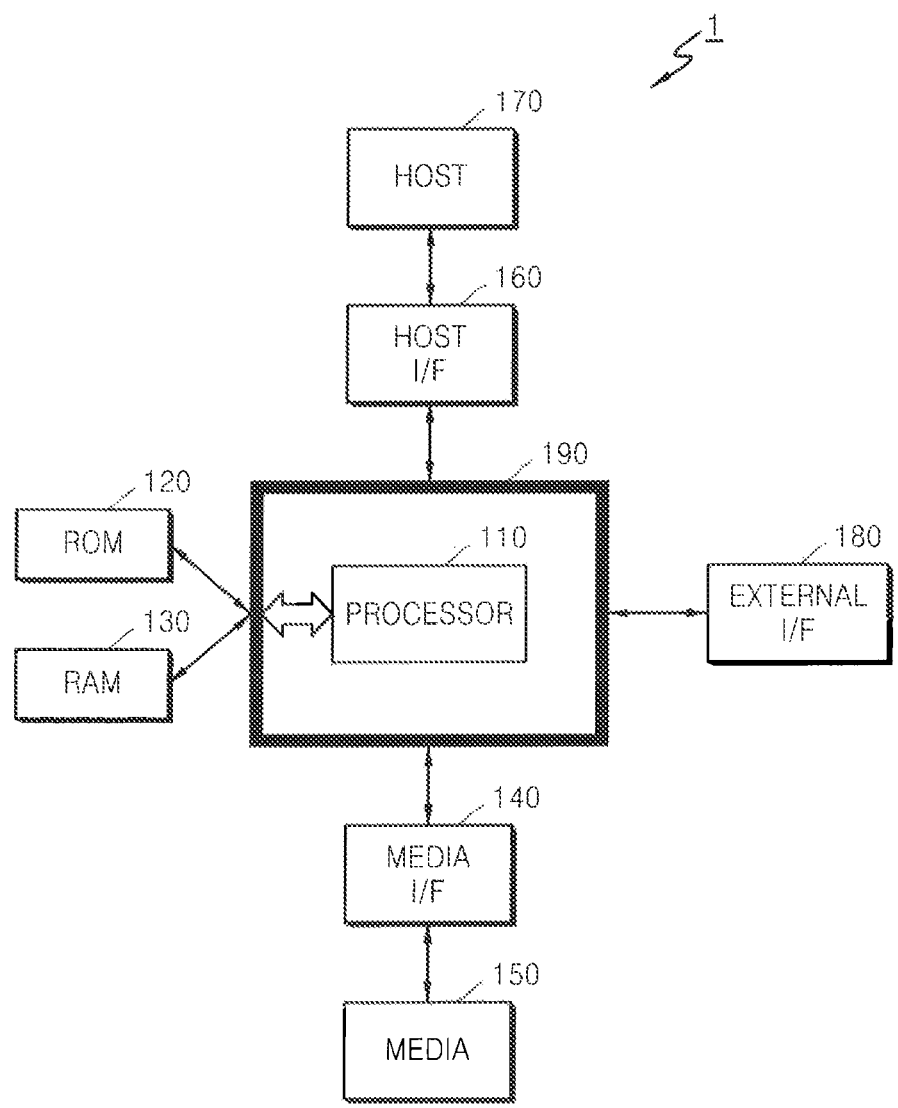
FIG. 1 is a block diagram illustrating a data storage device according to exemplary embodiments of the present inventive concept.

Exemplary embodiments are provided to further completely explain the present general inventive concept to one skilled in the art to which the present inventive concept pertains. However, the present general inventive concept is not limited thereto and it will be understood that various changes in form and details may be made therein without departing from the spirit and scope of the following claims. That is, descriptions on particular structures or functions may be presented merely for explaining exemplary embodiments of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a block diagram illustrating a data storage device 1 according to exemplary embodiments of the present general inventive concept. Referring to FIG. 1, the data storage device 1 according to exemplary embodiments of the present general inventive concept can include a processor 110, a read only memory (ROM) 120, a random access memory (RAM) 130, a media interface (I/F) 140, media 150, a host I/F 160, a host device 170, an external I/F 180, and a bus 190.

Processor 110 may be a microprocessor, a field programmable gate array, a programmable logic unit, and/or a controller.

The processor 110 can interpret commands and can control constituent elements of the data storage device 1 according to a result of interpretation. That is, the processor 110 can control the operation of the read only memory (ROM) 120, the random access memory (RAM) 130, the media interface (I/F) 140, the media 150, the host I/F 160, the external I/F 180, and the bus 190. The processor 110 can include a code object management unit to load code objects stored in the media 150 using the code object management unit into the RAM 130. The processor 110 can load code objects to protect information written to a recording medium, where the loaded code objects perform the methods illustrated in FIGS. 10 and 11.

Figure 10:
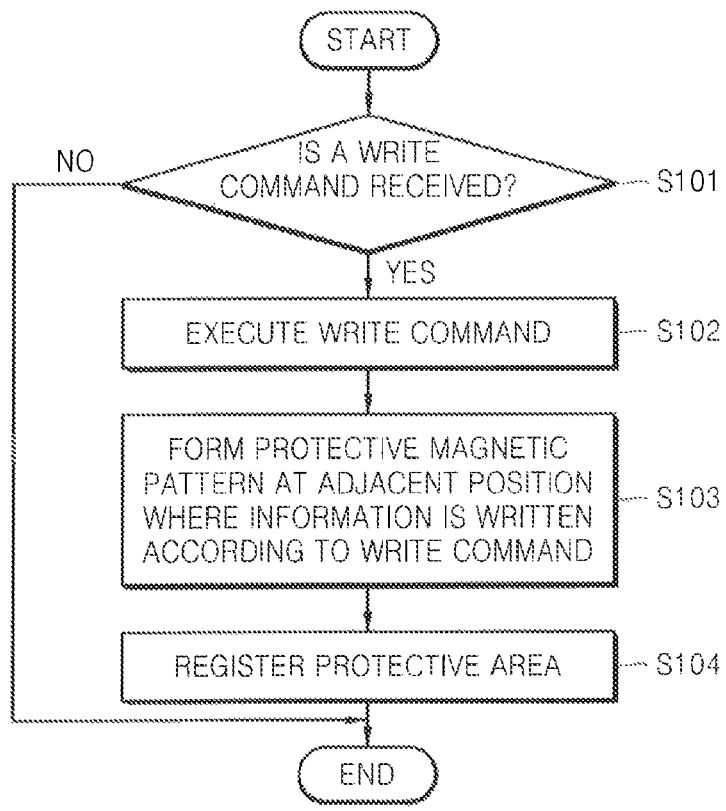
FIG. 10 is a flowchart illustrating a method of protecting information written to a recording medium according to exemplary embodiments of the present general inventive concept.
Figure 11:
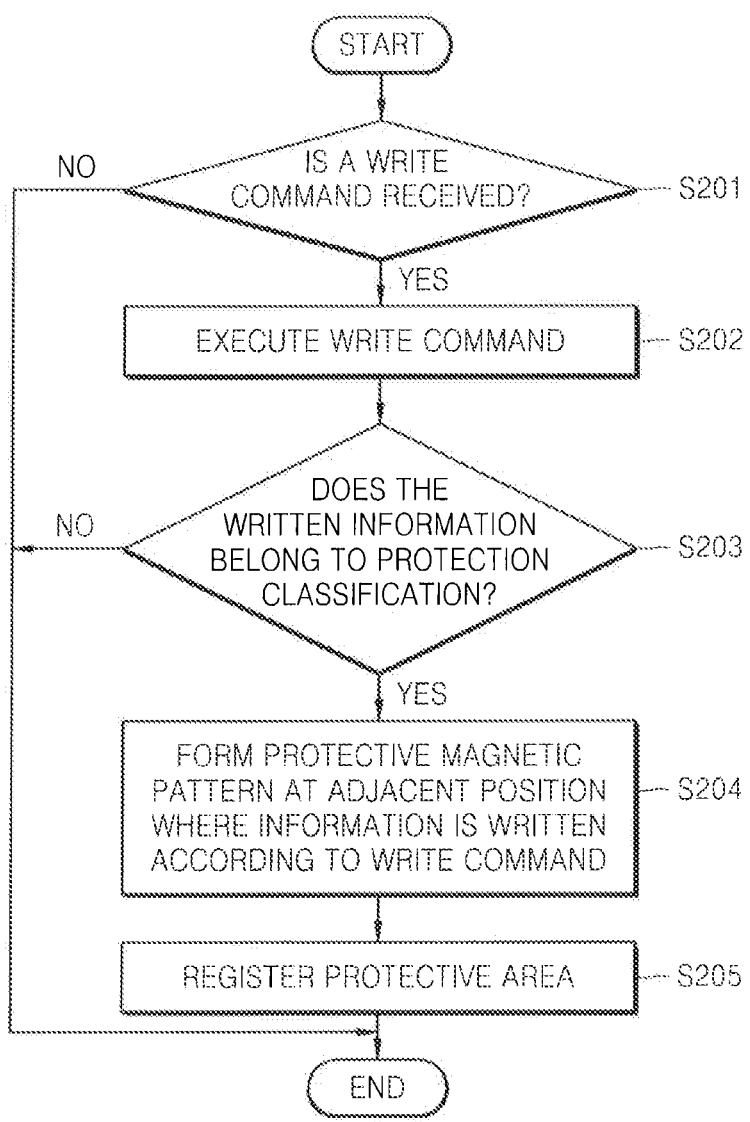
FIG. 11 is a flowchart illustrating a method of protecting information written to a recording medium according to exemplary embodiments of the present general inventive concept.

The processor 110 can execute a task to form a protective magnetic pattern to protect information written to a recording medium according to FIGS. 10 and 11 by using the code objects loaded into the RAM 130, Information to form and to process the protective magnetic pattern can be stored in the media 150 or ROM 120. The information to form and process the protective magnetic pattern may include, for example, protection classification information to classify information to form the protective magnetic pattern and area information on the area where the protective magnetic pattern is formed, The methods of protecting information written to a recording medium executed by the processor 110 will be described in detail below with reference to FIGS. 10 and 11.

Figure 3:
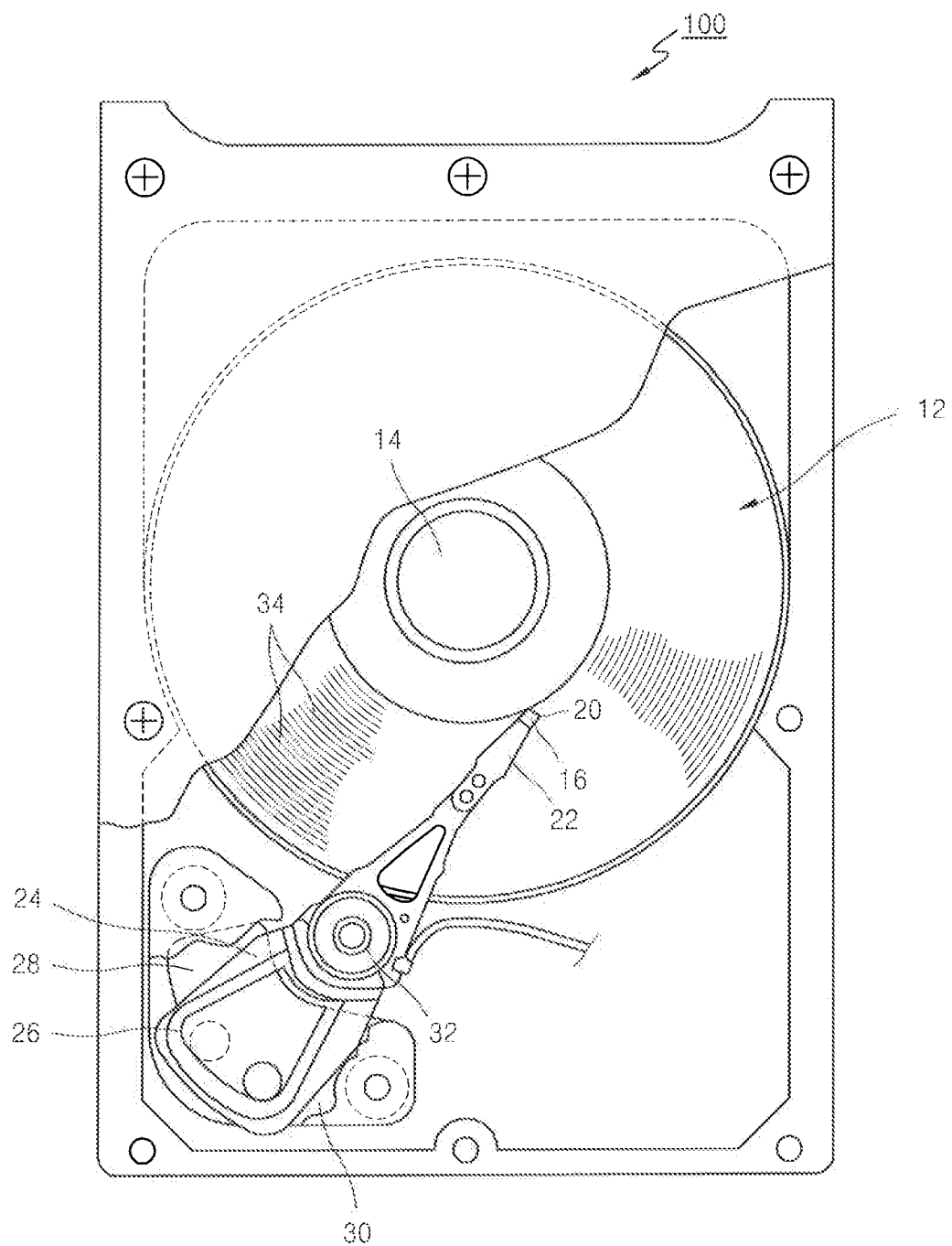
FIG. 3 is a plan view illustrating a head disk assembly of a disk drive according to exemplary embodiments of the present general inventive concept.

The ROM 120 can store program codes and data to operate the data storage device 1. The program codes and data stored in the ROM 120 or those stored in the media 150 can be loaded into the RAM 130 according to the control of the processor 110. The media 150 may include a disk as a main storage medium of the data storage device 1. The data storage device 1 may include a disk drive and/or a head disk assembly. FIG. 3 illustrates a detailed structure of a head disk assembly 100 including a disk 12 and a magnetic head 16 in the disk drive and/or head disk assembly 100.

Referring to FIG. 3, the head disk assembly 100 can include at least one disk 12 that is rotated by a spindle motor 14. The disk drive and/or head disk assembly 100 can include a magnetic head 16 located adjacent to a surface of the disk 12, The magnetic head 16 may detect a magnetic field of the disk 12 and magnetize the disk 12, to thereby read or write information with respect to the disk 12. The magnetic head 16 can be associated with the surface of the disk 12. Although the magnetic head 16 is illustrated and described as a single magnetic head, the magnetic head 16 can include a write head (a writer) to magnetize the disk 12 and a read head (a reader) to detect the magnetic field of the disk 12. The read head can be formed of a magneto-resistive (MR) element. The magnetic head 16 may be referred to as a head or a transducer, The magnetic head 16 may be mounted on a slider 20. The slider 20 can include a structure to generate an air bearing between the magnetic head 16 and the surface of the disk 12. The slider 20 can be attached to a head gimbal assembly 22. The head gimbal assembly 22 can be attached to an actuator arm 24 having a voice coil 26. The voice coil 26 can be located adjacent to a magnetic assembly 28 to define a voice coil motor (VCM) 30. A current supplied to the voice coil 26 can generate torque to rotate the actuator arm 24 with respect to a bearing assembly 32. The rotation of the actuator arm 24 can move the magnetic head 16 across the surface of the disk 12.

Figure 4:
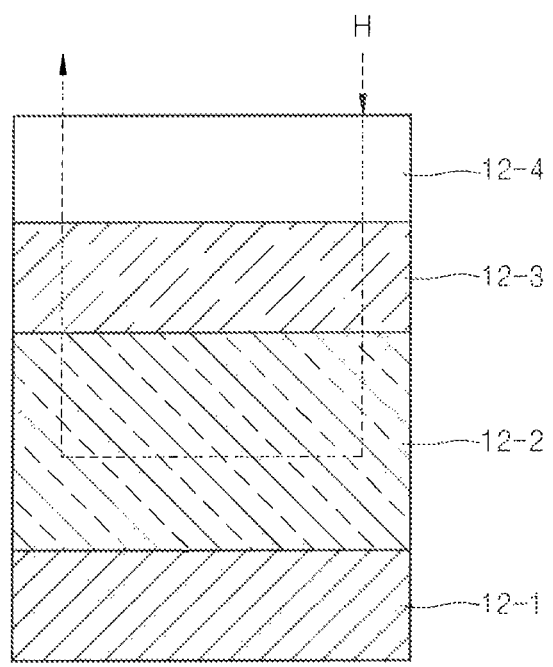
FIG. 4 illustrates a structure of a disk that is an example of a perpendicular magnetic recording medium of the present general inventive concept.

FIG. 4 illustrates a detailed structure of the disk 12 according to exemplary embodiments of the present general inventive concept. Referring to FIG. 4, the disk 12 can include a substrate 12-1, a soft magnetic underlayer 12-2, an intermediate layer 12-3, and a recording layer 12-4.

The substrate 12-1 may be formed of glass, an Al—Mg alloy, MgO, or Si. The soft magnetic underlayer 12-2 may be formed of a soft magnetic material including at least one of Co, Fe, and Ni. The intermediate layer 12-3 can be provided between the recording layer 12-4 and the soft magnetic underlayer 12-2 to improve crystal orientation and magnetic characteristics of the recording layer 12-4. The intermediate layer 12-3 may be formed of an alloy containing at least one of Ru, MgO, and Ni. The recording layer 12-4 can be a layer where information is written by perpendicular magnetization. The recording layer 12-4 may be formed of a magnetic thin film or a magnetic multilayer thin film including at least one of Co, Fe, Pt, and Pd to exhibit increased and/or superior perpendicular magnetic anisotropy. For example, the recording layer 12-4 may be formed of a CoCrPtx material.

In the disk 12 having the structure described above, a magnetic field generated by the write head included in the magnetic head 16 can form a magnetic path H that passes through the soft magnetic underlayer 12-2 and can return to the write head. When the magnetic path H is formed, a perpendicular component of the magnetic field can magnetize a magnetic domain of the recording layer 12-4 to record information.

In the magnetic recording, the recording density can be controlled and/or limited by a superparamagnetic effect. That is, as the recording density increases, the size of grains of a recording medium decreases and thus thermal stability decreases. When the recording density is greater than a predetermined limit, the direction of magnetic moment may not be maintained in one direction due to thermal agitation. The limit can be expressed by Inequality 1, $$(K_U V/K_B T) > 40 \quad \text{[Inequality 1]}$$

Here, "$K_U$" is a magnetic anisotropic constant, "V" is the volume of a grain, "$K_B$" is the Boltzmann's constant, and "T" is an absolute temperature.

Thus, according to Inequality 1, when there is an Increase In the recording density, there can be a decrease in thermal stability. However, since the rate of the decrease in V with respect to the increase in the recording density is fast, a process to protect a magnetic pattern written to a recording medium is needed. A method of protecting the written magnetic pattern is described below.

Figure 5:
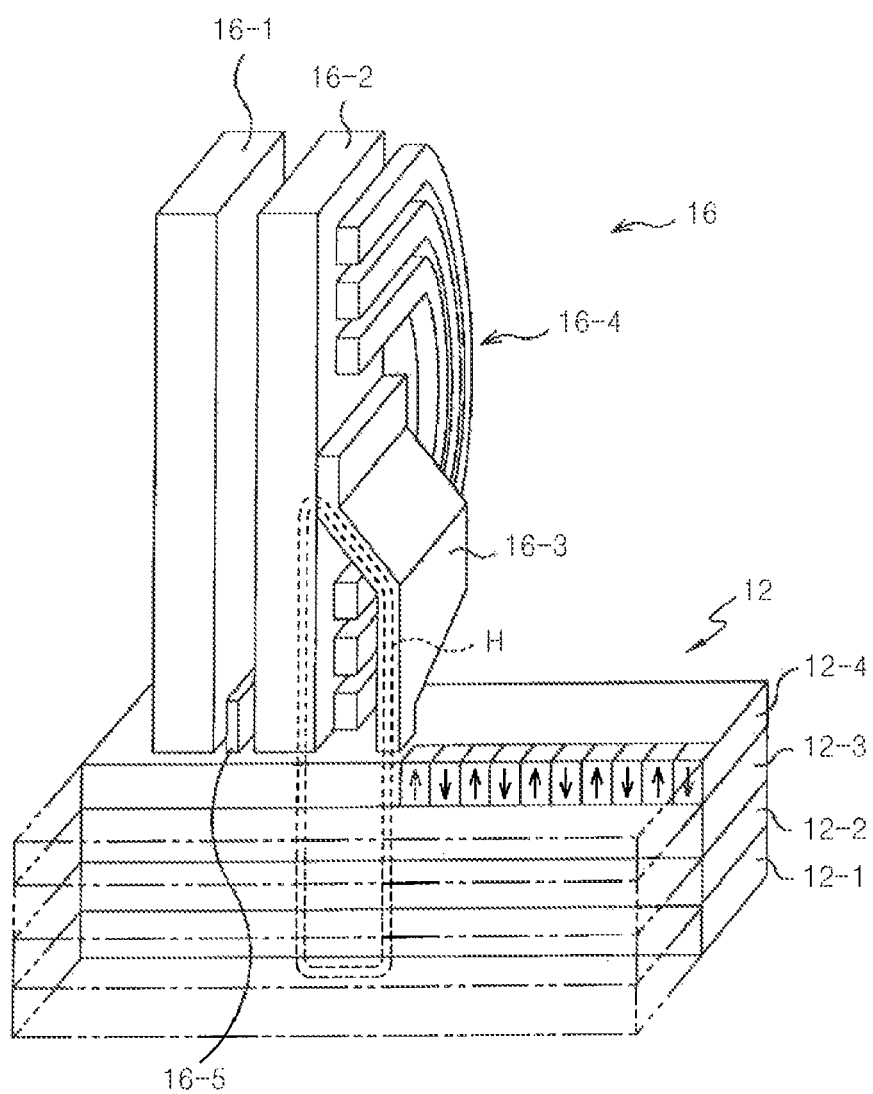
FIG. 5 illustrates a magnetic pattern on a disk and a structure of a magnetic head according to exemplary embodiments of the present general inventive concept.

FIG. 5 illustrates a structure of a magnetic head and a magnetic pattern on a disk according to exemplary embodiments of the present general inventive concept. Referring to FIG. 5, the magnetic head 16 can include a shield 16-1, a main pole 16-2 to apply a magnetic field to the disk 12, a return yoke 16-3 to form a magnetic path H with the main pole 16-2, a coil 16-4 to induce a magnetic field in the main pole 16-2, and a magneto-resistive (MR) element 16-5. Constituent elements including the main pole 16-2, the return yoke 16-3, and the coil 16-4 may be referred to as a write head, and the MR element 16-5 may be referred to as a read head.

As described above with reference to FIG. 4, the disk 12 can include the substrate 12-1, the soft magnetic underlayer 12-2, the intermediate layer 12-3, and the recording layer 12-4. In a write mode, when a current is supplied to the coil 16-4, the magnetic path H passing through the main pole 16-2 and the return yoke 16-3 can be formed so that a magnetic pattern can be magnetized in a perpendicular direction, that is, an upward direction or a downward direction, for each write bit is formed on the recording layer 124.

Figure 6:
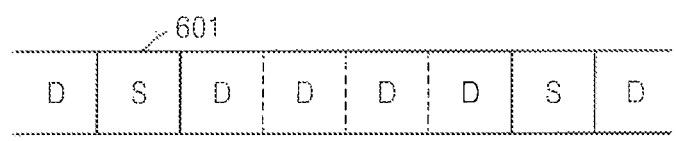
FIG. 6 illustrates a structure of a sector of a track in a disk that is a recording medium in exemplary embodiments of the present general inventive concept.

Referring back to FIG. 3, information can be stored in circular tracks 34 on the disk 12. Each track 34 can include a plurality of sectors. FIG. 6 illustrates a structure of a sector with respect to one track 34.

Referring to FIG. 6, a track can include a plurality of servo information fields S 601 in which servo information is written and a plurality of data sectors D in which data is stored. The data sectors D may be included between each servo information field S 601. Alternatively, one data sector D may be included between each servo information field S 601. Signals can be written to the servo information fields S 601 as shown in FIG. 7.

Figure 7:
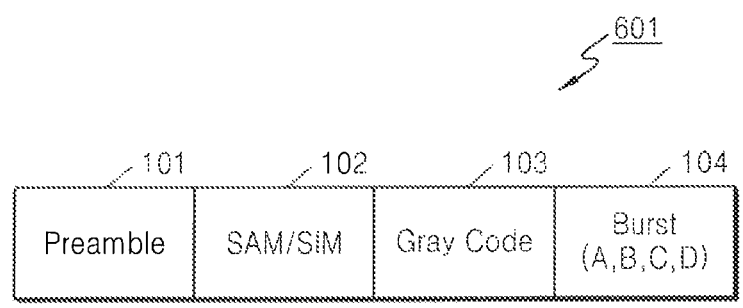
FIG. 7 illustrates a structure of a servo information area illustrated in FIG. 6 according to exemplary embodiments of the present general inventive concept.

Referring to FIG. 7, a preamble 101, a servo sync mark signal 102, a gray code 103, and a burst signal 104 can be written in each servo information field S 601. The preamble 101 can provide a clock sync signal when recording servo information and can provide a constant timing margin by placing a gap before a servo sector. The preamble 101 can determine gain of an auto gain control (AGC) circuit.

The servo sync mark signal 102 can include a servo address mark (SAM) and a servo index mark (SIM). The SAM can be a signal to indicate a start of a sector and the SIM can be a signal to indicate a start of the first sector in a track.

The gray code 103 can provide track information, The burst signal 104 can be a signal to control the magnetic head 16 to follow the center of the tracks 34. The burst signal 104 may include, for example, four patterns A, B, C, and D, and may generate a position error signal (PES) that is used for track following control by combining the four burst patterns.

Referring back to FIG. 3, a logical block address can be assigned to a recordable area of the disk 12. In a disk drive, the logical block address can be converted to cylinder/head/sector information so that a recording area of the disk 12 is designated. The disk 12 can be divided into a maintenance cylinder area where user access can be denied and a user data area where user access can be permitted. The maintenance cylinder area may be referred to as a system area. Information related to the operation of a disk drive can be stored in the maintenance cylinder area. The information related to the operation of a disk drive can include information to control a disk drive, for example, information to control the flying height of a magnetic head, retry table information, and defect list information.

The magnetic head 16 can move across the surface of the disk 12 to read or write information on one or more tracks. A plurality of code objects to control one or more functions and/or operations in a disk drive may be stored on the disk 12. For example, a code object to perform an MP3 player function, a code object to perform a navigation function, and a code object to perform one or more video game functions may be stored in the disk 12.

Referring back to FIG. 1, the processor 110 can write or read information by accessing the media 150 via the media I/F 140. In a data storage device including a disk drive, the media I/F 140 can include a servo circuit to control the head disk assembly 100 and a read/write channel circuit to process a signal for data read/write.

The host I/F 160 can perform a data transmission/receiving operation with the host device 170, which may be, for example, a personal computer, and may utilize any of various interfaces having a variety of specifications, for example, serial advance technology attachment (SATA), parallel advance technology attachment (PATA), or universal serial bus (USB), and/or any other suitable interface to carry out the exemplary embodiments of the present general inventive concept as disclosed herein.

The external I/F 180 can perform a data transmission/receiving operation with an external apparatus via input/output terminals installed at the data storage device 1. The external I/F 180 may use any of various interface having a variety of specifications such as an accelerated graphics port (AGP) interface, a USB interface, an IEEE1394 interface, a personal computer memory card international association (PCMCIA) interface, a local area network (LAN) interface, a Bluetooth interface, a high definition multimedia interface (HDMI), a programmable communication interface (PCI), an industry standard architecture (ISA) interface, a peripheral component interconnect-express (PCI-E) interface, an express card interface, a SATA interface, a PATA interface, or a serial interface.

The bus 190 can transfer information between one or more of the constituent elements of the data storage device 1 illustrated in FIG. 1.

Figure 2:
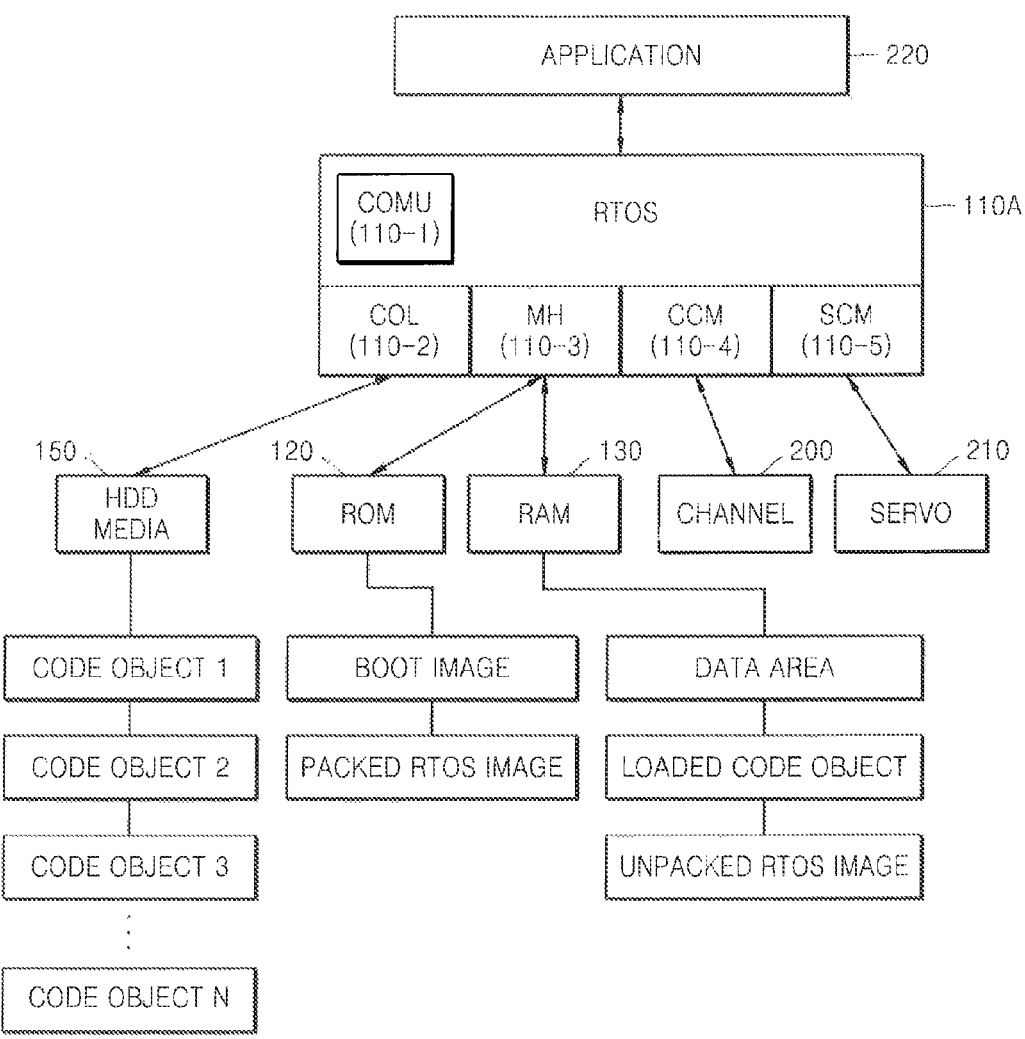
FIG. 2 is a block diagram illustrating a software operation system of the data storage device of FIG. 1 according to exemplary embodiments of the present general inventive concept.

FIG. 2 illustrates a software operation system of a head disk assembly (e.g., head disk assembly 100 illustrated in FIG. 3) and/or a hard disk drive that is an example of the data storage device 1. Referring to FIG. 2, a plurality of code objects 1-N can be stored in the media 150, which may be hard disk drive (HDD) media 150. The ROM 120 can store a boot image and a packed real-time operating system (RTOS) image.

The code objects 1-N can be stored on a disk of the HDD media 150. The code objects 1-N stored on the disk may include code objects to operate a disk drive and code objects related to one or more functions that may be extended to a disk drive. In particular, code objects to execute the methods illustrated in FIGS. 10 and 11, which are methods of protecting information written to a recording medium according to exemplary embodiments of the present inventive concept, can be stored on the disk. The code objects to execute the methods illustrated in FIGS. 10 and 11 may be stored in the ROM 120 instead of a disk of the HDD media 150. Also, code objects to perform one or more functions such as an MP3 player function, a navigation function, and a video game function may be stored on the disk of the HDD media 150.

The boot image can be read from the ROM 120 during a booting process and an unpacked RTOS image can be loaded into the RAM 130. Code objects to use a host interface and an external interface stored in the HDD media 150 can be loaded into tile RAM 130. Also, an area to store data DATA AREA can be assigned in the RAM 130.

One or more circuits to perform a signal operation of a data read/write operation can be included in a channel circuit (CHANNEL) 200. One or more circuits to control the head disk assembly 100 to read/write data can be included in a servo circuit (SERVO) 210.

An RTOS 110A can be a real-time operating system program and may be a multi-program operating system that uses a disk. According to a task, real-time multi-processing can be performed in a foreground routine with a high priority and a batch process can be performed in a background routine with a low priority. Loading of the code objects on the disk and unloading of the code objects on the disk can be performed (e.g., both can be performed).

The RTOS 110A can manage a code object management unit (COMU) 110-1, a code object loader (COL) 110-2, a memory handler (MH) 110-3, a channel control module (CCM) 110-4, and a servo control module (SCM) 110-5, and can perform a task according to a requested command. The RTOS 110A can manage application programs 220.

In detail, during the booting process of a disk drive, the RTOS 110A can load the code objects to control a disk drive into the RAM 130. Thus, when the booting process is performed, the disk drive may be operated by using the code objects loaded into the RAM 130.

The COMU 110-1 can store position information indicating where code objects are written, can convert a virtual address to an actual address, and can arbitrate and/or manage a bus. The COMU 110-1 can store information on priorities of tasks that are being executed and/or are to be executed. Also, the COMU 110-1 can manage task control block (TCB) information and stack information needed to perform a task with respect to a code object.

The COL 110-2 can load the code objects that are stored in the HDD media 150 into the RAM 130 by using the COMU 110-1 or can unload the code objects stored in the RAM 130. Accordingly, the COL 110-2 may load, into the RAM 130, the code objects to perform the methods of protecting information written to a recording medium according to the flowcharts Illustrated in FIGS. 10 and 11 that are stored in the HDD media 150.

The RTOS 110A may perform the methods of protecting information written to a recording medium according to the flowcharts illustrated in FIGS. 10 and 11, which will be described below, by using the code objects loaded into the RAM 130, The MH 110-3 can perform a data read/write operation with respect to the ROM 120 and the RAM 130.

The CCM 110-4 can control a channel to perform a signal operation to read/write data, and can perform servo control on the head disk assembly to perform the data read/write.

Figure 8:
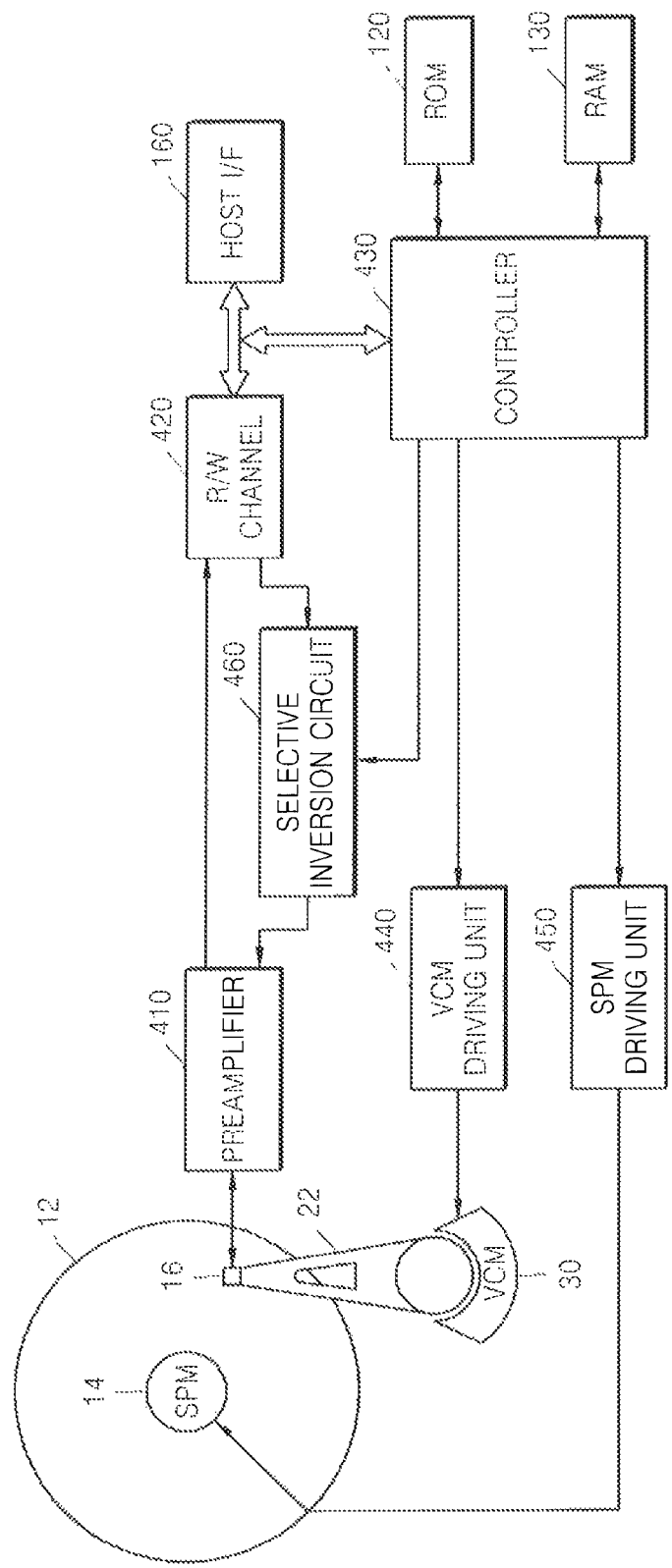
FIG. 8 is a block diagram illustrating an electrical structure of a disk drive according to exemplary embodiments of the present general inventive concept.

FIG. 8 illustrates an electrical structure of a disk drive that is an example of the data storage device 1 illustrated in FIG. 1. Referring to FIG. 8, the disk drive according to exemplary embodiments of the present general inventive concept can include a preamplifier 410, a read/write (R/W) channel 420, a controller 430, a voice coil motor (VCM) driving unit 440, a spindle motor (SPM) driving unit 450, a selective inversion circuit 460, the ROM 120, the RAM 130, and the host I/F 160. The selective inversion circuit 460 may be included in the same printed circuit board or integrated circuit chip as the preamplifier 410.

The controller 430 may be a digital signal processor (DSP), a microprocessor, or a microcontroller. The controller 430 can control the R/W channel 420 to read information from the disk 12 or write information to the disk 12 according to a command received from the host device 170 via the host 1/F 160.

The controller 430 can be coupled to the VCM driving unit 440. The VCM driving unit 440 can supply a driving current to drive the VCM 30. The controller 430 can supply a control signal to the VCM driving unit 440 to control the motion of the magnetic head 16.

The controller 430 can be communicatively connected to the SPM driving unit 450. The SPM driving unit 450 can supply a driving current to drive a spindle motor (SPM) 14.

When power is supplied to a disc drive, the controller 430 can supply a control signal to the SPM driving unit 450 to rotate the SPM 14 at a target speed.

The controller 430 can be connected to the selective inversion circuit 460 and can generate a selection control signal SEL_CON to selectively inverse an input signal in the selective inversion circuit 460 according to a mode being executed.

The controller 430 can be communicatively connected to the ROM 120 and the RAM 130. The ROM 120 can store firmware and control data to control a disk drive, and can store program codes and information to perform the methods illustrated in FIGS. 10 and 11. The program codes and information to perform the methods illustrated in FIGS. 10 and 11 may be stored in the maintenance cylinder area of the disk 12 instead of the ROM 120, The controller 430 may load, into the RAM 130, the program codes and information to perform the methods of protecting information written to a recording medium stored in the ROM 120 or the disk 12, and control constituent elements to perform the methods illustrated in FIGS. 10 and 11.

A general data read operation and a data write operation of a disk drive are described below. In a data read mode of a disk drive, the preamplifier 410 can amplify an electric signal sensed by the magnetic head 16 from the disk 12. In the R/W channel 420, an automatic gain control circuit (not illustrated) to automatically vary gain according to the amplitude of a signal can amplify a signal output from the preamplifier 410, can convert the amplified signal to a digital signal, can decode the digital signal to detect data, can convert the detected data to stream data, and can transmit the stream data to the host device 170 via the host I/F 160.

In a data write mode of a disk drive, data can be input from the host device 170 via the host I/F 160. The R/W channel 420 can encode the data into a format suitable for a write channel (e.g., a predetermined format). The encoded data can pass through the selective inversion circuit 460 and can be written to the disk 12 by the magnetic head 16 by a write current amplified by the preamplifier 410.

An operation of protecting information written to the disk 12 in a disk drive is described below. The selective inversion circuit 460 of FIG. 8 is described with reference to a detailed circuit structure of FIG. 9.

Figure 9:
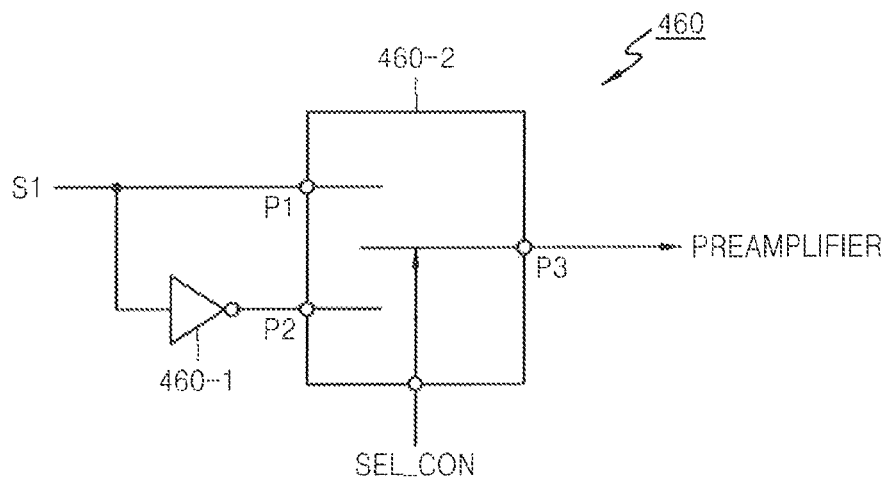
FIG. 9 is a circuit diagram illustrating a selective inversion circuit of FIG. 8 according to exemplary embodiments of the present general inventive concept.

Referring to FIG. 9, the selective inversion circuit 460 can include an inverter 460-1 and a multiplexer 460-2. A signal applied to a first input terminal P1 of the multiplexer 460-2 can be an encoded signal S1 that is processed by the R/W channel 420 in the data write mode. A signal having a phase that is inverted by 180° from the phase of the signal S1 by the inverter 460-1 can be applied to a second input terminal P2 of the multiplexer 460-2. The multiplexer 460-2 can be operated to connect one of the first input terminal P1 and the second input terminal P2 to an output terminal P3 according to the selection control signal SEL_CON.

The controller 430 can generate the selection control signal SEL_CON. In detail, the controller 430 can generate the selection control signal SEL_CON to connect the first input terminal P1 of the multiplexer 460-2 to the output terminal P3 in a section where information is to be written according to a write command, and may generate the selection control signal SEL_CON to connect the second input terminal P2 of the multiplexer 460-2 to the output terminal P3 in a section where a magnetic pattern for protecting the written information is to be formed.

In another example, the controller 430 may generate the selection control signal SEL_CON to connect the second input terminal P2 of the multiplexer 460-2 to the output terminal P3 only in a section where a magnetic pattern to protect the written information is to be formed. The controller 430 may generate the selection control signal SEL_CON to connect the first input terminal P1 of the multiplexer 460-2 to the output terminal P3 in the other sections.

The operation of protecting information written to the disk 12 is described with reference to FIGS. 8 and 9. In the data write mode, Information to be written can be stored in the RAM 130 under the control of the controller 430. The controller 430 can supply a VCM control signal to the VCM driving unit 440 to move the magnetic head 16 to a track position of the disk 12 where the information is to be written. The VCM driving unit 440 can generate a driving current corresponding to the applied VCM control signal and can supply the generated driving current to the VCM 30. Accordingly, the magnetic head 16 can be moved to the track position on the disk 12 where the information is to be written. The controller 430 can control writing of information by generating a write gate pulse at a sector position of the track where the information is to be written.

The R/W channel 420 can encode the information to be written in a format suitable for the write channel and can output the encoded information to the selective inversion circuit 460. The selective inversion circuit 460 can connect one of the first input terminal P1 and the second input terminal P2 to the output terminal P3 according to the selection control signal SEL_CON. The first input terminal P1 of the multiplexer 460-2 can be connected to the output terminal P3 in the section where information is to be written according to the data write mode. Accordingly, the signal S1 encoded by the R/W channel 420 is applied to the preamplifier 410 via the output terminal P3 of the multiplexer 460-2.

The preamplifier 410 can generate a current corresponding to the signal output from the selective inversion circuit 460 and can apply the generated current to the coil 16-4 of the magnetic head 16. Thus, a magnetic pattern corresponding to the information to be written can be formed at a sector position of a track of the disk 12 where the information is to be written.

When the information is written, the controller 430 can perform an operation to form a protective magnetic pattern to protect the information written to the disk 12.

That is, the controller 430 can generate a VCM control signal to move the magnetic head 16 to the position of a track adjacent to the track where the information to be protected is written. Accordingly, the magnetic head 16 can be moved to the position of a track adjacent to the track where the information to be protected is written. In other words, when the track of a disk where the information to be protected is written is the N-th track, the adjacent track may be the (N−1)th track or the (N+1)th track.

When the track of a disk where the information to be protected is written is the N-th track, the controller 430 may control the magnetic head 16 to be moved to the (N−1)th track. When the magnetic head 16 is moved to the (N−1)th track, the controller 430 can generate a write gate pulse at a sector position facing the sector where the information to be protected is written to from the protective magnetic pattern.

The information written in the N-th track can be read from the RAM 120, in the form output by the R/W channel 420, and output to the selective inversion circuit 460. The selective inversion circuit 460 can connect one of the first input terminal P1 and the second input terminal P2 to the output terminal P3 according to the selection control signal SEL_CON. Since a writing section can correspond to the section where the protective magnetic pattern is formed, the second input terminal P2 of the multiplexer 460-2 can be connected to the output terminal P3 so that a signal having a phase that is inverted by 180° from the phase of the signal S1 encoded by the R/W channel 420 can be applied to the preamplifier 410 via the output terminal P3 of the multiplexer 460-2.

Accordingly, the preamplifier 410 can generate a current corresponding to the signal output from the selective inversion circuit 460 and can apply the generated current to the coil of the magnetic head 16. Thus, a protective magnetic pattern having a phase difference of 180° from the magnetic pattern with respect to bits of the information to be protected in the (N−1)th track, which is adjacent to the N-th track of the disk 12 where the information to be protected is written, can be formed with bits of the n−1th track opposite to the bits of the n-th track.

The controller 430 may form a protective magnetic pattern having a phase difference of 180° from the magnetic pattern with respect to bits of the information to be protected in the (N+1)th track with bits of the n−1th track opposite to the bits of the n-th track, in the same method as described above.

Figures 12, 13:
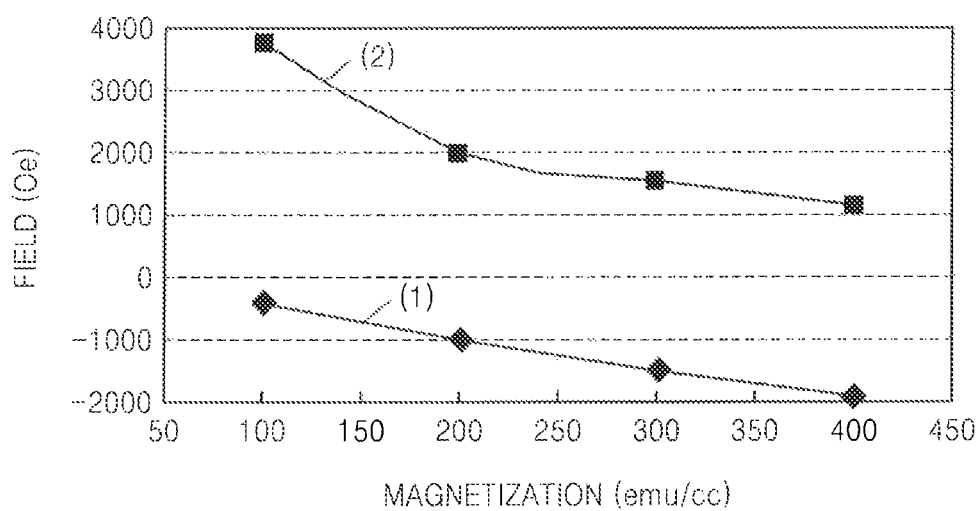
FIG. 12 illustrates a magnetic pattern and a protective magnetic pattern with respect to information written by a method of protecting information written to a recording medium according to exemplary embodiments of the present general inventive concept.
FIG. 13 is a graph illustrating a static magnetic force and a coupling force generated when a method of protecting information written to a recording medium according to exemplary embodiments of the present general inventive concept.

When the magnetic pattern corresponding to the information to be protected that is written in the N-th track is formed as illustrated in FIG. 12, a protective magnetic pattern having a phase difference of 180° from the magnetic pattern corresponding to the information to be protected may be formed in each of the (N−1)th track and the (N+1)th track with the bits facing each other being opposite to each other.

The controller 430 may control the formation of a protective magnetic pattern only in an adjacent track, that is, one of the (N−1)th track or the (N+1)th track.

The controller 430 can register the area where the protective magnetic pattern is formed as a protection area and thus the area can be managed so that no information can be stored thereon. That is, the controller 430 can register information on the positions of the area where the protective magnetic pattern are formed, on a protection area table, and can store the protection area table in the maintenance cylinder area of the disk 12 or in the ROM 130. Thus, by referring to the protection area table, the controller 430 can minimize and/or prevent the area where the protective magnetic pattern is formed from being accessed during data read or data write.

In FIG. 12, "O" can denote a magnetization direction from the recording layer 12-4 of the disk 12 to the magnetic head 16, whereas "X" can denote a magnetization direction from the magnetic head 16 to the recording layer 12-4 of the disk 12. Referring to FIG. 12, a protective magnetic pattern having a phase difference of 180° from the magnetic pattern with respect to bits of the information to be protected can be formed in tracks adjacent to a track where the information to be protected is written.

The controller 430 may form protective magnetic patterns at adjacent positions with respect to all information written to the disk 12. The controller 430 may control a disk drive in such a way that, in consideration of the recording density of a disk and only when information whose frequency of use is classified as being higher than a critical frequency, a protective magnetic pattern can be formed at a position adjacent to where information is written.

In exemplary embodiments of the present general inventive concept, only when the information written to the disk 12 is classified as being related to the operation of a disk drive, the controller 430 may control the disk drive to form a protective magnetic pattern at a position adjacent to a position where the information is written. The information related to the operation of a disk drive may include, for example, information to control the flying height of a magnetic head, retry table information, or defect list information.

The methods of protecting information written to a recording medium according to exemplary embodiments of the present general inventive concept performed by the control of the processor 110 of the data storage device 1 of FIG. 1 are described below with reference to FIGS. 10 and 11.

Referring to FIG. 10, in a method of protecting information written to a recording medium according to exemplary embodiments of the present general inventive concept, the processor 110 can determine whether a write command is received through the host I/F 160 at operation S101. When a write command is received, the processor 110 can execute the received write command at operation S102. That is, the processor 110 can control the media I/F 140 to record information to be stored at a target position of the media 150. The media 150 can include a magnetic recording medium and may be, for example, a disk. The media I/F 140 may write information on the media 150 using a perpendicular magnetic recording method. Accordingly, a first magnetic pattern corresponding to the information to be stored can be formed on the media 150.

According to the write command, the processor 110 can perform an operation to form a protective magnetic pattern at a position adjacent to where information is written at operation S103. That is, the processor 110 can control the media I/F 140 so as to form a protective magnetic pattern having a phase difference of 180° from the first magnetic pattern at a position on the media 150 adjacent to where the first magnetic pattern corresponding to the information to be protected is formed. In other words, the processor 110 can control the media I/F 140 such that a protective magnetic pattern having a phase difference of 180° from the magnetic pattern with respect to bits of the information to be protected can be formed at a position on the media 150 adjacent to where the information to be protected can be written, with bits of adjacent tracks opposite to each other.

As an example. when the media 150 is a disk, when a magnetic pattern corresponding to the information to be protected is written in the N-th track and is formed as illustrated in FIG. 12, a protective magnetic pattern having a phase difference of 180° from the magnetic pattern corresponding to the information to be protected may be formed in each of the (N−1)th track and the (N+1)th track. The protective magnetic pattern may be formed only in one adjacent track, that is, one of the (N−1)th track or the (N+1)th track.

The processor 110 can register the area where the protective magnetic pattern is formed, as a protection area that is managed in such a way that no information can be stored thereon at operation S104. That is, the processor 110 can register information on the position of the area where the protective magnetic pattern is formed, on a protection area table, and can store the protection area table in the media 150 or the ROM 130. Thus, by referring to the protection area table, the processor 110 can minimize and/or prevent the area where the protective magnetic pattern is formed from being accessed during data read or data write.

Referring to FIG. 11, in a method of protecting information written to a recording medium according to exemplary embodiments of the present general inventive concept, the processor 110 can determine whether a write command is received through the host I/F 160 at operation S201. When a write command is received, the processor 110 can execute the received write command at operation S202. That is, the processor 110 can control the media I/F 140 to record information to be stored at a target position of the media 150. The media 150 can include a magnetic recording medium and may be, for example, a disk. The media I/F 140 may write information on the media 150 using a perpendicular magnetic recording method. Accordingly, a first magnetic pattern corresponding to the information to be stored can be formed on the media 150.

In response to the write command, the processor 110 can determine whether the information written to the media 150 belongs to a protection classification at operation S203. Information that belongs to the protection classification may include, for example, information whose frequency of use is higher than a critical frequency (e.g., higher than a predetermined frequency). The information that belongs to the protection classification may include, for example, information related to the operation of a data storage device. When the data storage device is a disk drive, information that belongs to the protection classification may include, for example, information needed to control the flying height of a magnetic head, retry table information, and defect list information.

According to the determination in the operation S203, when the information written to the media 150 according to the write command belongs to a protection classification, the processor 110 can perform an operation to form a protective magnetic pattern at a position adjacent to where information is written according to the write command at operation S204. That is, the processor 110 can control the media 1/F 140 to form a protective magnetic pattern having a phase difference of 180° from the first magnetic pattern at a position on the media 150 adjacent to where the first magnetic pattern corresponding to the information to be protected is formed. In other words, the processor 110 can control the media I/F 140 so that a protective magnetic pattern having a phase difference of 180° from the magnetic pattern with respect to bits of the information to be protected can be formed at a position on the media 150 adjacent to where the information to be protected is written, with bits of adjacent tracks opposite to each other.

The processor 110 can register the area where the protective magnetic pattern is formed, as a protection area that is managed so that no information can be stored thereon at operation S205. That is, the processor 110 can register information on the position of the area where the protective magnetic pattern is formed, on a protection area table, and can store the protection area table in the media 150 or the ROM 130. Thus, by referring to the protection area table, the processor 110 can minimize and/or prevent the area where the protective magnetic pattern is formed from being accessed during data read or data write.

As described above, a coupling force can be generated as a protective magnetic pattern having a phase difference of 180° from the magnetic pattern with respect to bits of the information to be protected and can be formed at a position adjacent to where the information to be protected is written, with the bits of adjacent tracks opposite to each other.

As an example, FIG. 13 illustrates a result of measuring a magnetostatic force and a coupling force when the interval of protective magnetic patterns in a bit pattern is written in a size of 6 nm×6 nm. In FIG. 13, a graph (1) illustrates a magnetostatic force and a graph (2) illustrates a coupling force. Referring to FIG. 13, a strong magnetization force can be generated by the coupling force and thus the written information may be protected.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. The computer-readable transmission medium can be transmitted through carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although several embodiments of the present invention have been shown and described, it would be appreciated by those skilled in the art that changes may be made in these embodiments without departing from the principles and spirit of the general Inventive concept, the scope of which is defined in the claims and their equivalents.

What is claimed is:

1. A data storage device, comprising:
a recording medium;
a controller unit to generate control signals in response to write information and write commands; and
a transducer section coupled to receive the controls signals, and in response, write the write information into the recording medium and form a data protection pattern in the recording medium adjacent to the write information; wherein
the data protection pattern is formed in an area of the recording medium managed by the data storage device to not store write information thereon, and
the controller unit is configured to determine if the write information has a predetermined classification, and to generate the control signals in response to the write information having the predetermined classification, and to not generate the control signals in response to the write information lacking the predetermined classification.

2. The data storage device of claim 1, wherein:
the controller unit is configured to determine if the write information has the predetermined classification based on a type of write information being recorded.

3. The data storage device of claim 1, wherein:
the controller unit is configured to determine if the write information has the predetermined classification based on a frequency of use of the of write information being recorded.

4. The data storage device of claim 1, wherein:
the transducer section includes a selective inversion circuit that inverts the write information to form the data protection pattern.

5. The data storage device of claim 1, further including:
the recording medium includes a protected area corresponding to first logical addresses and a non-protected area corresponding to second logical addresses; and
the controller unit is configured to generate the control signals for write information written to the first logical addresses and not for write information written to the second logical addresses.

6. The data storage device of claim 1, wherein:
the transducer section is configured to encode the write information as it is written into the recording medium in response to the control signals.

7. A system, comprising:
a recording medium; and
a controller unit configured to control a recording of write information in the recording medium and a form at least a first data protection pattern in the recording medium adjacent to the write information that improves data storage characteristics of the write information as recorded in the recording medium; wherein
the data protection pattern is formed in an area of the recording medium managed by the system to not store write information thereon, and
the controller is configured to form the first data protection pattern when the write information has a predetermined classification, and not form the first data protection pattern when the write information does not have the predetermined classification.

8. The system of claim 7, wherein:
the controller is configured to form the first data protection pattern by inverting the write data recorded in the recording medium.

9. The system of claim 7, wherein:
the recording medium is divided into different areas accessible according to logical addresses; and
the controller is configured to form the first data protection pattern for write information recorded at some logical addresses, and to not form the first data protection pattern for write information recorded at other logical addresses.

10. The system of claim 7, wherein:
the controller configured to form a second data protection pattern in the recording medium adjacent to the write information; wherein
the write data is recorded in the recoding medium between the first and second data protection patterns.

* * * * *